(No Model.)

A. HITT.
HOSE COUPLING.

No. 524,679. Patented Aug. 14, 1894.

Witnesses
Edward Thorpe.
Frank B. Packard.

Inventor
Adrian Hitt
By his Attorneys
Murphey & Metcalf

UNITED STATES PATENT OFFICE.

ADRIAN HITT, OF JERSEY CITY, NEW JERSEY, ASSIGNOR OF FIVE-EIGHTHS TO HARRY G. SIMON AND ISRAEL JONES COBIN, OF NEW YORK, N. Y.

HOSE-COUPLING.

SPECIFICATION forming part of Letters Patent No. 524,679, dated August 14, 1894.

Application filed April 21, 1893. Serial No. 471,246. (No model.)

*To all whom it may concern:*

Be it known that I, ADRIAN HITT, a citizen of the United States, and a resident of Jersey City, Hudson county, New Jersey, have invented a certain new and useful Improvement in Hose-Couplings, of which the following is a full, clear, and exact description, reference being had to the accompanying drawings, forming part of this specification.

The object of my invention is the construction of a reversible two part hose coupling adapted to couple together hose or tubing used to convey steam, air, gas, water or other fluids.

The coupling is of that class which comprises two like parts or halves which, upon being coupled, are wedged together so as to form a tight joint by their own weight, and which are uncoupled by simply depressing their outer ends.

Figure 1:
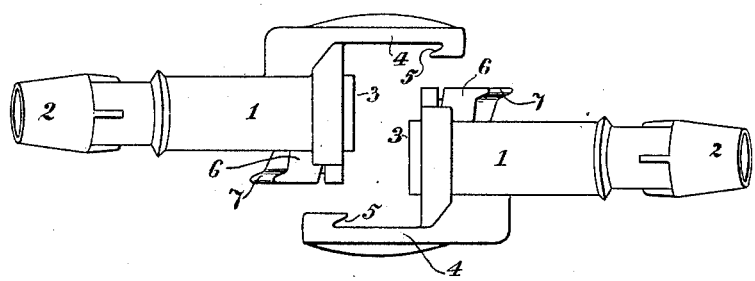
Figure 2:
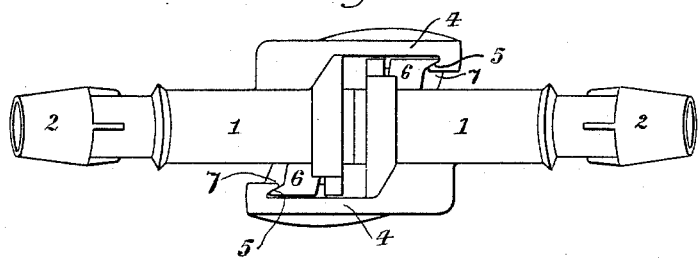
Figure 3:
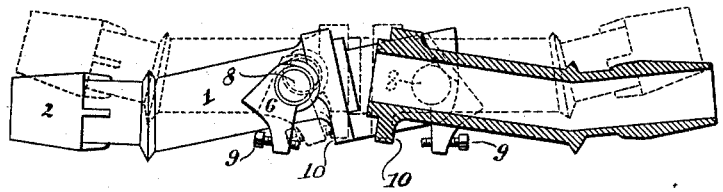
Figure 4:
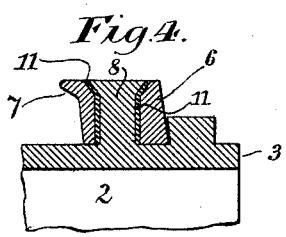

In the accompanying drawings, Figure 1 is a plan view of my improved coupling, showing the two parts or halves separated, and Fig. 2 is a similar view showing them coupled together. Fig. 3 is a side elevation, partly in section, showing in full lines the position of the parts while being coupled, and in dotted lines the position of the parts when coupled. Fig. 4 is a detail longitudinal sectional view of the movable locking lug.

Similar figures of reference are employed to designate corresponding parts in all the views.

Both halves of the coupling are precisely alike. The body portion 1 of each half is angled to form an upwardly projecting neck 2, to which the hose or tubing is connected, and is cored out to afford a suitable passage for the gas, air, steam or other fluid. The body 1 of each half of the coupling is provided with a seat 3, which is arranged at right angles to the passage through the coupling, and which is properly faced to insure a tight joint when the two parts of the coupling are brought together. The body 1 is provided with an extension or arm 4, upon which is formed an undercut flange 5 which engages with the locking lug 6 on the other half of the coupling. The body 1, neck 2, seat 3 and arm 4, with its undercut flange 5, are preferably cast from metal in one piece.

The engaging surface 7 of the locking lug 6 is inclined to the plane of the seat 3 so that it acts as a wedge to force the seats 3 together when the flange 5 is brought into engagement therewith. The locking lug 6 is pivotally mounted on a stud 8 on the opposite side of the coupling from which the arm 4 extends, so that that portion 7 of the lug which engages with the flange 5 may swing toward and away from the plane of the seat 3. A set screw 9 is carried by a projection on the lug 6, and its end is arranged to bear against the projection 10 formed on one side of the coupling, thus permitting the position of the engaging surface 7 of the lug to be varied relatively to the plane of the seat 3. By this means any wearing of the locking surfaces of the coupling may be compensated for, and the perfect meeting of the seats 3 of the two parts thereof insured.

When the coupling is made of iron, I interpose a copper sleeve 11 between the locking lug 6 and the stud 8 to prevent oxidation by which the free movement of the lug 6 might be interfered with.

One end of the hose to be coupled is attached to the neck 2 on one of the halves of the coupling, and the other end of the hose is attached to the corresponding neck on the opposite half. The parts are then held so that the flange 5 on each part will strike the inclined edge 7 of the locking lug 6 on the other part. The meeting ends of the parts are then moved or permitted to fall until the bodies 1 are in line, when the seats 3 will have been carried into engagement and will be held tightly together by the weight of the couplings which are suspended from the connecting hose ends. The coupling is particularly desirable for coupling the steam or gas hose between railway cars, and when used for that purpose, so long as the coupling hangs pendent between the cars, it will remain tightly closed; but any longitudinal strain on the couplings, such as would be produced by the uncoupling of cars, will draw down the upturned necks of the coupling, and throwing up the meeting ends, will automatically unlock the coupling.

Not only does the pivoted locking lug permit adjustment to compensate for wear, but it also facilitates the coupling of the parts and causes the seats 3 to approach each other in substantially parallel planes, thus obviating the danger of defacing one seat by contact with the edges of the other during the coupling operation.

It is not to be understood that the seat 3 is necessarily integral with the body of the coupling, as it may if desired be formed of softer or different metal or material and properly fitted into the end of the body 2 in a manner well understood in the art.

Another advantage possessed by my improved coupling is that it will interlock with, and either section may be used interchangeably with, other couplings now in general use, such for instance as the "Sewall" coupling.

Having thus described my invention, what I claim as new, and desire to secure by Letters Patent, is—

A reversible hose coupling consisting of two like sections, each of which is provided with a seat, an arm 4 carrying a locking flange 5, a pivoted locking lug having its engaging surface inclined to the plane of the seat, and adjusting mechanism for varying the angular position of said engaging surface, substantially as shown and described.

ADRIAN HITT.

Witnesses:
   FRANK B. PACKARD,
   S. G. METCALF.